(12) United States Patent
Jones et al.

(10) Patent No.: US 11,429,130 B2
(45) Date of Patent: Aug. 30, 2022

(54) SYSTEMS AND METHODS FOR OPTIMIZING SOLAR DEVICE OPERATIONS

(71) Applicant: DISH Network L.L.C., Englewood, CO (US)

(72) Inventors: Kevin Kemps Jones, Denver, CO (US); Christopher William Bruhn, Aurora, CO (US)

(73) Assignee: DISH Network L.L.C., Englewood, CO (US)

( * ) Notice: Subject to any disclaimer, the term of this patent is extended or adjusted under 35 U.S.C. 154(b) by 200 days.

(21) Appl. No.: 16/741,958

(22) Filed: Jan. 14, 2020

(65) Prior Publication Data

US 2021/0216093 A1 Jul. 15, 2021

(51) Int. Cl.
*G05F 1/67* (2006.01)
*H02S 50/00* (2014.01)
*H02J 7/00* (2006.01)

(52) U.S. Cl.
CPC ............ *G05F 1/67* (2013.01); *H02J 7/00032* (2020.01); *H02S 50/00* (2013.01); *H02J 2300/26* (2020.01)

(58) Field of Classification Search
CPC ..... G05F 1/67; H02J 7/00032; H02J 2300/26; H02J 2310/58; H02J 7/0063; H02J 2310/54; H02J 7/35; H02S 50/00
See application file for complete search history.

(56) References Cited

U.S. PATENT DOCUMENTS

| | | | | |
|---|---|---|---|---|
| 2004/0117137 A1* | 6/2004 | Jin | ..................... | G01R 31/3842 702/63 |
| 2013/0038124 A1* | 2/2013 | Newdoll | ................. | H02J 3/385 307/31 |
| 2015/0070188 A1* | 3/2015 | Aramburu | ............ | A01G 25/167 340/870.02 |
| 2017/0038497 A1* | 2/2017 | Hern | ..................... | G01K 13/00 |

* cited by examiner

*Primary Examiner* — Rexford N Barnie
*Assistant Examiner* — Thai H Tran
(74) *Attorney, Agent, or Firm* — Seed Intellectual Property Law Group LLP

(57) ABSTRACT

A method includes obtaining data indicating an amount of energy stored by a battery of a sensor device; receiving data related to at least one condition in an area in which the sensor device is located; determining a reporting interval based on the data indicating the amount of energy stored by the battery of the sensor device and the data related to at least one condition in the area in which the sensor device is located; transmitting data indicating the reporting interval to the sensor device; and receiving a plurality of measurement reports transmitted from the sensor device according to the reporting interval. The energy consumed by the sensor device can be dynamically modified by dynamically modifying the reporting interval.

19 Claims, 7 Drawing Sheets

| Operating Mode | Sensor 130 | | Sensor 132 | | Sensor 134 | | Sensor 136 | |
|---|---|---|---|---|---|---|---|---|
| | Sensing Interval | Reporting Interval | Sensing Interval | Reporting Interval | Sensing Interval | Reporting Interval | Sensing Interval | Reporting Interval |
| 0 | -1 | -1 | -1 | -1 | -1 | -1 | -1 | -1 |
| 1 | 30 minutes | 60 minutes | -1 | -1 | -1 | -1 | -1 | -1 |
| 2 | 30 minutes | 60 minutes | 30 minutes | 60 minutes | -1 | -1 | -1 | -1 |
| 3 | 30 minutes | 60 minutes | 30 minutes | 60 minutes | 30 minutes | 60 minutes | -1 | -1 |
| 4 | 30 minutes | 60 minutes | 30 minutes | 60 minutes | 30 minutes | 60 minutes | 30 minutes | 60 minutes |
| 5 | 20 minutes | 60 minutes | 20 minutes | 60 minutes | 20 minutes | 60 minutes | 20 minutes | 60 minutes |
| 6 | 15 minutes | 45 minutes | 15 minutes | 45 minutes | 15 minutes | 45 minutes | 15 minutes | 45 minutes |
| 7 | 15 minutes | 30 minutes | 15 minutes | 30 minutes | 15 minutes | 30 minutes | 15 minutes | 30 minutes |
| 8 | 10 minutes | 30 minutes | 10 minutes | 30 minutes | 10 minutes | 30 minutes | 10 minutes | 30 minutes |
| 9 | 10 minutes | 20 minutes | 10 minutes | 20 minutes | 10 minutes | 20 minutes | 10 minutes | 20 minutes |
| 10 | 5 minutes | 10 minutes | 5 minutes | 10 minutes | 5 minutes | 10 minutes | 5 minutes | 10 minutes |
| 11 | 5 minutes | 10 minutes | 5 minutes | 10 minutes | 5 minutes | 10 minutes | 5 minutes | 10 minutes |
| 12 | 5 minutes | 5 minutes | 5 minutes | 5 minutes | 5 minutes | 5 minutes | 5 minutes | 5 minutes |

*FIG. 7A*

| Operating Mode | Battery Capacity Level (BCL) | Solar Energy Level (SEL) |
|---|---|---|
| 0 | BCL <= BCL0 | SEL <= SEL0 |
| 1 | BCL0 < BCL <= BCL1 | SEL <= SEL0 |
| 2 | BCL1 < BCL <= BCL2 | SEL <= SEL0 |
| 3 | BCL2 < BCL <= BCL3 | SEL <= SEL0 |
| 4 | BCL3 < BCL <= BCL4 | SEL <= SEL0 |
| 5 | BCL4 < BCL <= BCL5 | SEL0 < SEL <= SEL1 |
| 6 | BCL4 < BCL <= BCL5 | SEL1 < SEL <= SEL2 |
| 7 | BCL5 < BCL <= BCL6 | SEL2 < SEL <= SEL3 |
| 8 | BCL5 < BCL <= BCL6 | SEL3 < SEL <= SEL4 |
| 9 | BCL6 < BCL <= BCL7 | SEL4 < SEL <= SEL5 |
| 10 | BCL6 < BCL <= BCL7 | SEL5 < SEL <= SEL6 |
| 11 | BCL7 < BCL <= BCL8 | SEL6 < SEL <= SEL7 |
| 12 | BCL7 < BCL <= BCL8 | SEL7 < SEL <= SEL8 |

*FIG. 7B*

SYSTEMS AND METHODS FOR OPTIMIZING SOLAR DEVICE OPERATIONS

TECHNICAL FIELD

The present disclosure relates to devices that are powered by solar energy and more particularly to dynamically modifying operations of devices that are powered by solar energy in order to dynamically modify electrical energy consumption by those devices.

DESCRIPTION OF THE RELATED ART

Conventionally, electronic devices may operate using solar energy. Devices that are powered by solar energy may be affected by variations in the amount of sunlight available to illuminate solar panels that provide power to such devices. For example, devices running on solar energy may not be able to operate at the same capacity during a period of bad weather as they can during a period of good weather. Accordingly, it is desirable to provide devices and methods that dynamically modify operations of devices that are powered by solar energy so that they can continue operating in all weather conditions.

BRIEF SUMMARY

The present application teaches devices and methods that configure sensor devices, which are powered by solar energy, to take sensor readings at a specified rate or at a specified interval of time, and to transmit messages used to report sensor measurement data at a specified rate or at a specified interval of time. For example, a sensor device may be dynamically configured based on a current mode of operation of the sensor device, cellular coverage levels, and a current state of a battery of the sensor device, in conjunction with publically available sets of historical data related to solar intensity or weather and/or predicted weather in an area in which the sensor device is located. By way of another example, a sensor device may be dynamically configured based on current readings of the sensor device regarding relative humidity, temperature, and pressure in an area in which the sensor device is located that are used to generate trends in humidity, temperature, and pressure in the area, which are used to reliably predict future cloud formations in a microclimate in the area that affect the ability of a solar panel of the sensor device to generate power. Additionally, the present application teaches devices and methods that set specific orientations (e.g., angles) of solar panels of the sensor devices during periods of time (e.g., seasons) in which different solar and/or weather patterns are expected. Accordingly, the present application teaches devices and methods that dynamically configure sensor devices in a manner which ensures that the sensor devices remain operational without blackouts in data collection, for example, during extended periods of high cloud coverage and/or low temperatures.

Accordingly, devices and methods according to the present disclosure may result in fewer technicians being required to maintain a network of sensor devices compared to conventional networks, which can advantageously reduce operating costs. Instead of sending a technician into a remote area to perform routine maintenance on a sensor device according to a fixed schedule, a technician may be dispatched to perform maintenance on the sensor device only if the sensor device is not expected to have a minimum level of functionality in the future. For example, a technician may not be sent to perform maintenance on a sensor device if the sensor device can be reconfigured to consume a reduced amount of energy during a period of time in which a reduced amount of solar energy is expected to be available to provide power to the solar device. For example, if a solar panel that provides power to a sensor device is dirty, the output of the solar panel may be only 75% of the expected output. However, if sunny weather is predicted for the next month, cleaning and/or servicing of the solar panel may be postponed until the weather is predicted to be less sunny.

A method may be summarized as including obtaining data indicating an amount of energy stored by a battery of a sensor device, receiving data related to at least one condition in an area in which the sensor device is located, determining a first reporting interval based on the data indicating the amount of energy stored by the battery of the sensor device and the data related to at least one condition in the area in which the sensor device is located, transmitting data indicating the first reporting interval to the sensor device, and receiving a plurality of measurement reports transmitted from the sensor device according to the first reporting interval.

The method also may include determining a second reporting interval, which is greater than the first reporting interval, transmitting data indicating the second reporting interval to the sensor device, and receiving a plurality of measurement reports transmitted from the sensor device according to the second reporting interval.

The method also may include receiving data indicating an amount of energy generated by a solar panel of the sensor device, and the first reporting interval may be determined based in part on the data indicating the amount of energy generated by the solar panel of the sensor device.

The data related to at least one condition in the area in which the sensor device is located may indicate a temperature value for the area in which the sensor device is located.

The method also may include obtaining data related to an amount of energy consumed by the sensor device, and the determining the first reporting interval may include determining the first reporting interval based on the data indicating the amount of energy stored by the battery of the sensor device, the data related to at least one condition in the area in which the sensor device is located, and the data related to the amount of energy consumed by the sensor device.

The method also may include determining an operating parameter of a sensor of the sensor device based on the data indicating the amount of energy stored by the battery of the sensor device, the data related to at least one condition in the area in which the sensor device is located, and the data indicating the first reporting interval, and transmitting data indicating the operating parameter of the sensor of the sensor device.

The method also may include generating data indicating that at least one a sensor of the sensor device is to be turned off perform a sensing operation less frequently than the sensor is currently performing the sensing operation based on the data indicating the amount of energy stored by the battery of the sensor device, the data related to at least one condition in an area in which the sensor device is located, and the data indicating the first reporting interval, and transmitting the data indicating that the sensor of the sensor device is to be perform the sensing operation less frequently than the sensor is currently performing the sensing operation to the sensor device.

The method also may include receiving data related to weather that is predicted for the area in which the sensor device is located, and the first reporting interval may be determined based in part on the data related to weather that is predicted for the area in which the sensor device is located.

The first reporting interval may be based in part on data related to a strength of a signal received from the sensor device.

A device a method may be summarized as including at least one processor, and at least one memory storing instructions that, when executed by the at least one processor, cause the device to: obtain data indicating an amount of energy stored by a battery of a sensor device, receive data related to at least one condition in an area in which the sensor device is located, determine a first reporting interval based on the data indicating the amount of energy stored by the battery of the sensor device and the data related to at least one condition in the area in which the sensor device is located, transmit data indicating the first reporting interval to the sensor device, and receive a plurality of measurement reports transmitted according to the first reporting interval from the sensor device.

The instructions, when executed by the at least one processor, may cause the device to determine a second reporting interval, which greater than the first reporting interval, transmit data indicating the second reporting interval to the sensor device; and receive a plurality of measurement reports transmitted from the sensor device according to the second reporting interval.

The instructions, when executed by the at least one processor, may cause the device to receive data indicating an amount of energy generated by a solar panel of the sensor device, and the first reporting interval may be determined based in part on the data indicating the amount of energy generated by the solar panel of the sensor device.

The at least one memory may store data related to an amount of energy consumed by the sensor device, and the instructions, when executed by the at least one processor, may cause the device to determine the first reporting interval based on the data indicating the amount of energy stored by the battery of the sensor device, the data related to at least one condition in the area in which the sensor device is located, and the data related to the amount of energy consumed by the sensor device.

The instructions, when executed by the at least one processor, may cause the device to determine an operating parameter of a sensor of the sensor device based on the data indicating the amount of energy stored by the battery of the sensor device, the data related to at least one condition in the area in which the sensor device is located, and the data indicating the first reporting interval, and transmit data indicating the operating parameter of the sensor of the sensor device.

The instructions, when executed by the at least one processor, may cause the device to generate data indicating that at least one sensor of the sensor device is to be turned off based on the data indicating the amount of energy stored by the battery of the sensor device, the data related to at least one condition in the area in which the sensor device is located, and the data indicating the first reporting interval, and transmit to the sensor device the data indicating that at least one sensor of the sensor device is to be turned off.

The instructions, when executed by the at least one processor, may cause the device to receive data related to weather that is predicted for the area in which the sensor device is located, and the first reporting interval may be based in part on the data related to weather that is predicted for the area in which the sensor device is located.

The first reporting interval may be based in part on data related to a strength of a signal received from the sensor device.

The instructions, when executed by the at least one processor, may cause the device to generate a message that, when processed by the sensor device, causes the sensor device to change an orientation of the solar panel, and transmit the message to the sensor device.

A non-transitory computer-readable medium may be summarized as storing instructions that, when executed by a computer, cause the computer to obtain data indicating an amount of energy stored by a battery of a sensor device, receive data related to at least one condition in an area in which the sensor device is located, determine a first reporting interval based on the data indicating the amount of energy stored by the battery of the sensor device and the data related to at least one condition in the area in which the sensor device is located, transmit data indicating the first reporting interval to the sensor device, and receive a plurality of measurement reports transmitted from the sensor device according to the first reporting interval.

The instructions, when executed by the computer, may cause the computer to determine a second reporting interval, which is greater than the first reporting interval, transmit data indicating the second reporting interval to the sensor device, and receive a plurality of measurement reports transmitted from the sensor device according to the second reporting interval.

BRIEF DESCRIPTION OF THE SEVERAL VIEWS OF THE DRAWINGS

FIGS. 7A and 7B are examples of tables according to one or more embodiments of the present disclosure.

DETAILED DESCRIPTION

Figure 1:
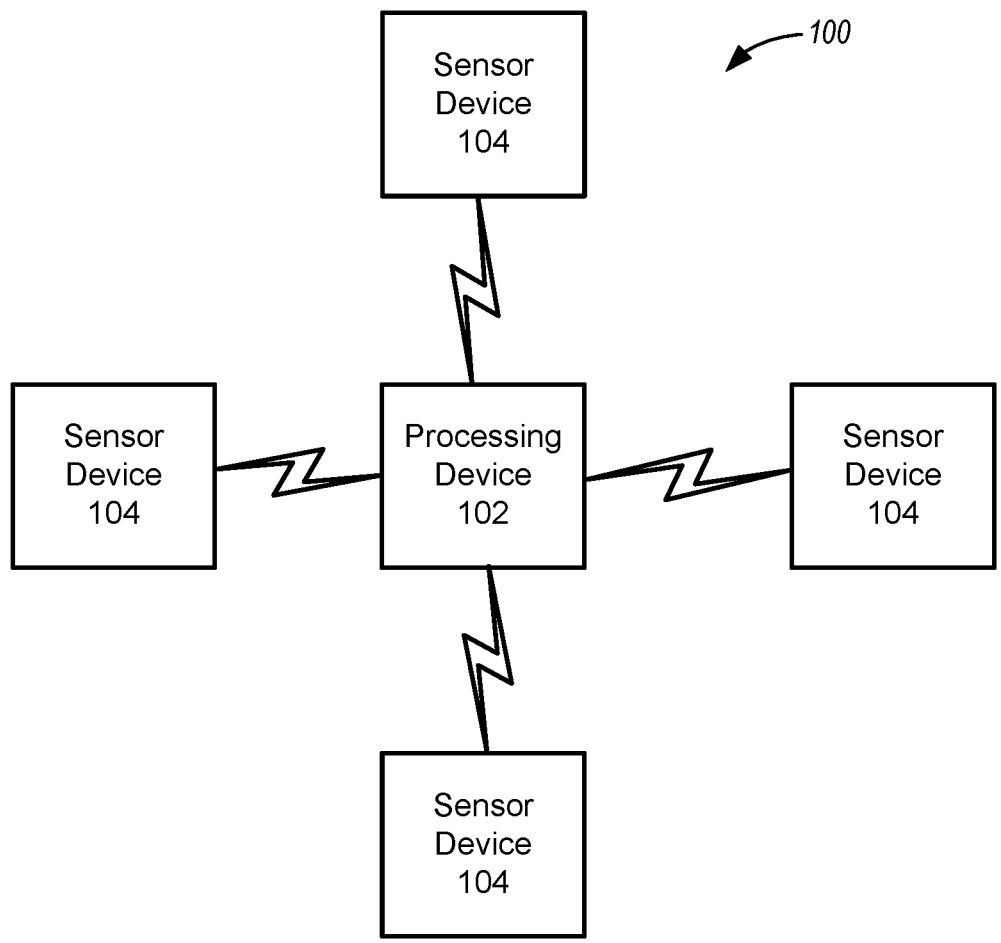
FIG. 1 is a block diagram of a system according to one or more embodiments of the present disclosure.

FIG. 1 is a block diagram of a system 100 according to one or more embodiments of the present disclosure. The system 100 includes a processing device 102 and a plurality of sensor devices 104. Although FIG. 1 shows four of the sensor devices 104, the system 100 may include any number of the sensor devices 104. Each of the sensor devices 104 can communicate with the processing device 102. For example, each of the sensor devices 104 can communicate with the processing device 102 via a cellular network. In one or more embodiments, the sensor devices 104 are air quality monitoring stations including solar panels that provide energy to rechargeable batteries, which provide power to operate those devices. In one or more embodiments, the sensor devices 104 are weather monitoring stations including solar panels that provide energy to batteries that provide power to operate those devices. In one or more embodiments, the sensor devices 104 are located remotely from the processing device 102, and the sensor devices 104 communicate with the processing device 102 using machine-type communications (MTC) or Narrow Band Internet of Things (NB-IoT) technology from the 3rd Generation Partnership Project (3GPP).

Figure 2:
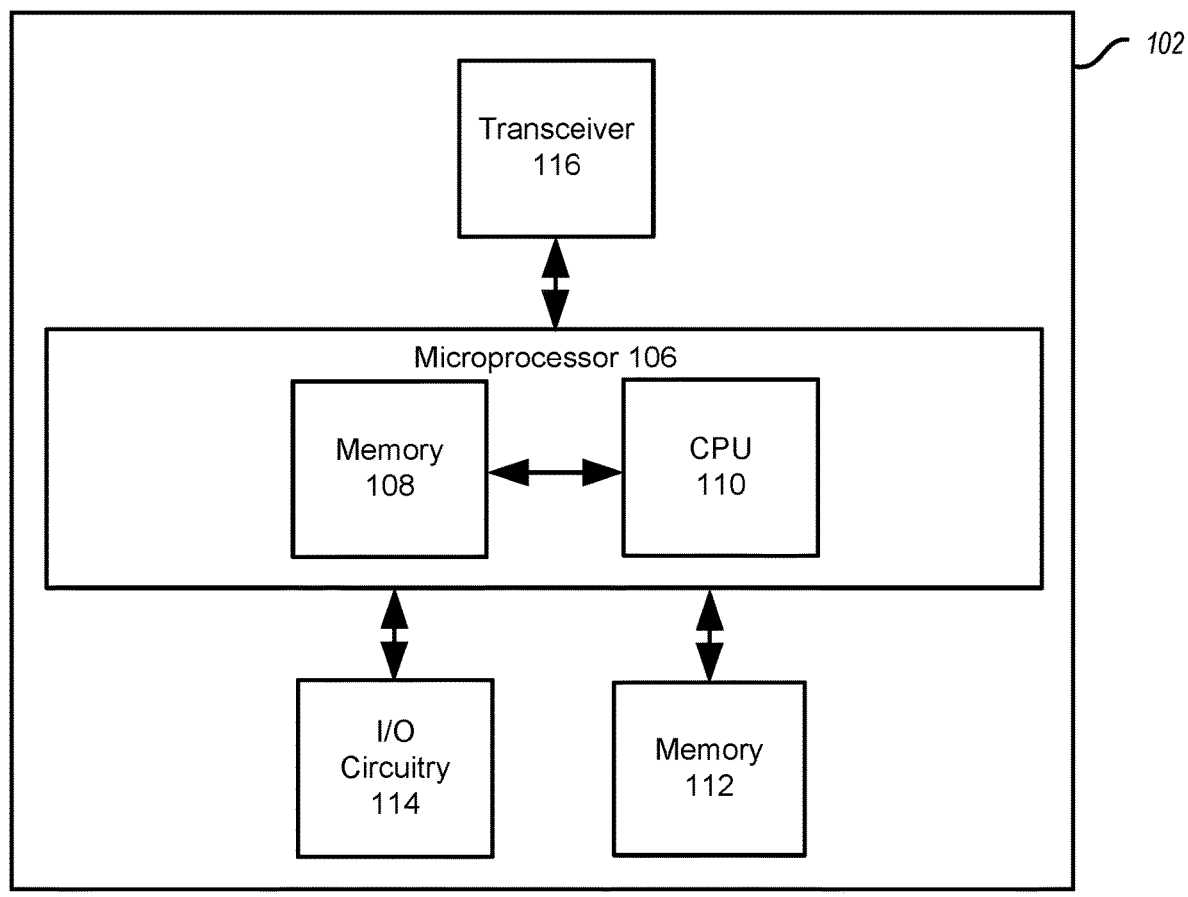
FIG. 2 is a block diagram of a processing device according to one or more embodiments of the present disclosure.

FIG. 2 is a block diagram of a processing device 102 according to one or more embodiments of the present disclosure. The processing device 102 includes a microprocessor 106, which includes a memory 108 and a central processing unit (CPU) 110, a memory 112, input/output (I/O) circuitry 114, and a transceiver 116. In one or more embodiments, the processing device 102 includes a display device (not shown).

In one or more embodiments, the memory 112 stores processor-executable instructions that, when executed by the CPU 110, cause the processing device 102 to perform the functions of the processing device 102 described herein. The CPU 110 uses the memory 108 as a working memory while executing the instructions. In one or more embodiments, the memory 108 is comprised of one or more random access memory (RAM) modules. In one or more embodiments, the memory 112 is comprised of one or more non-volatile random access memory (NVRAM) modules, such as electronically erasable programmable read-only memory (EEPROM) or Flash memory modules, for example.

In one or more embodiments, the I/O circuitry 114 includes buttons, switches, dials, knobs, a touchscreen, or other user-interface elements for inputting commands to the processing device 102. The I/O circuitry 114 also may include a speaker, one or more light emitting devices, or other user-interface elements for outputting information or indications from the processing device 102. The I/O circuitry 114 may include one or more data interfaces, for example, a 40-pin extended general-purpose input/output (GPIO) interface, a universal serial bus (USB) interface, a stereo output and composite video port, a high-definition multimedia interface (HDMI), camera serial interface (CSI), display serial interface (DSI), and a micro secure digital slot (MicroSD slot).

In one or more embodiments, the transceiver 116 is configured to transmit and receive data signals in accordance with the Institute of Electrical and Electronics Engineers (IEEE) 802.3 communication standards. In one or more embodiments, the transceiver 116 is configured to transmit and receive radio frequency (RF) signals in accordance with the Bluetooth (registered trademark) communication standards. In one or more embodiments, the transceiver 116 is configured to transmit and receive RF signals in accordance with the IEEE 802.11 AC communication standards. In one or more embodiments, the transceiver 116 is configured to transmit and receive RF signals in accordance with one or more 3GPP communication standards, including 3G, 4G, 4G Long Term Evolution (LTE), 5G, etc. In one or more embodiments, the transceiver 116 includes a transmitter and a receiver that are provided in a single integrated circuit chip. The transceiver 116 may be configured to transmit and receive signals in accordance with other communications standards without departing from the scope of the present disclosure.

Figure 3:
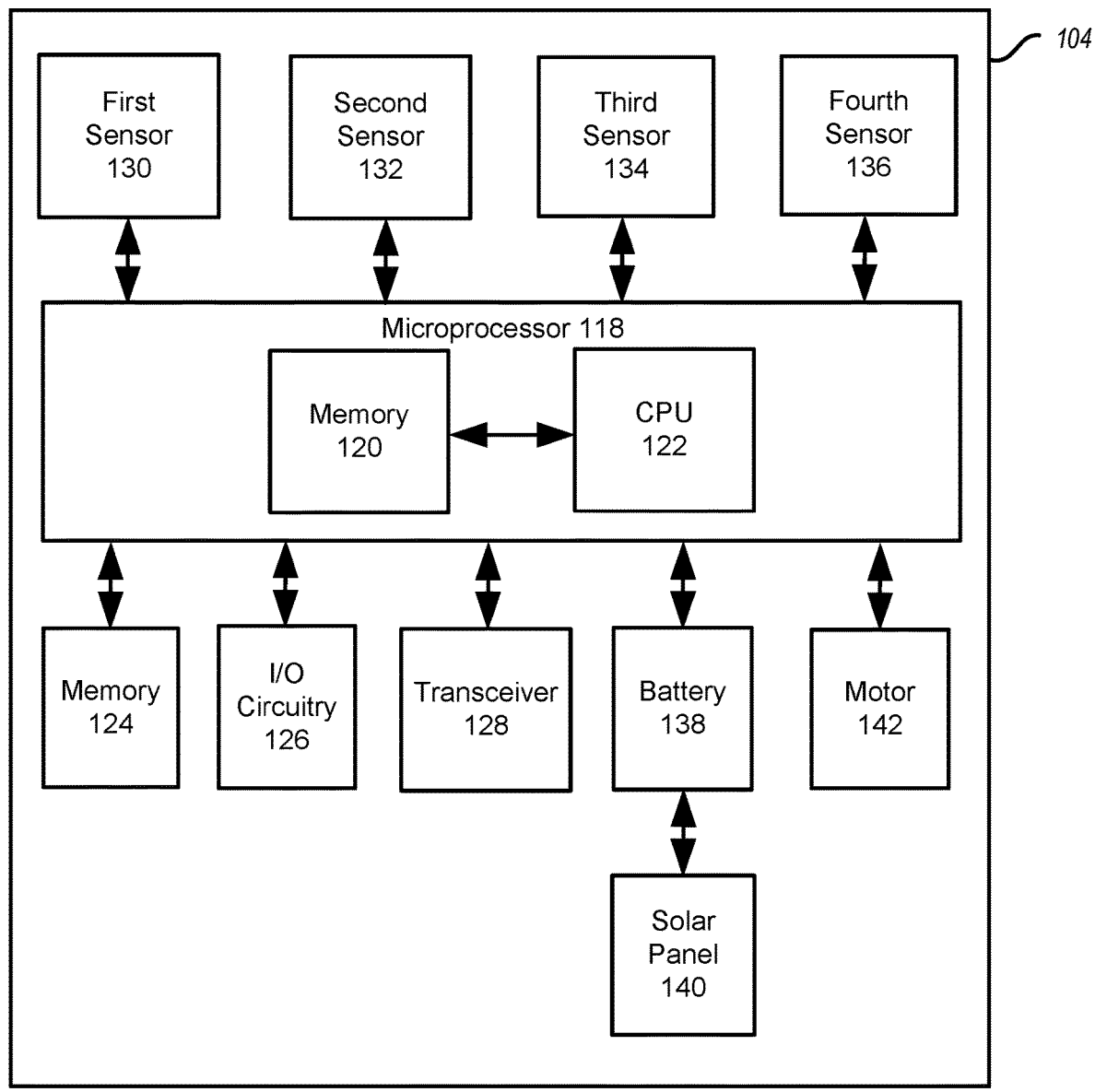
FIG. 3 is a block diagram of a sensor device according to one or more embodiments of the present disclosure.

FIG. 3 is a block diagram of a sensor device 104 according to one or more embodiments of the present disclosure. The sensor device 104 includes a microprocessor 118, which includes a memory 120 and a CPU 122, a memory 124, input/output (I/O) circuitry 126, a transceiver 128, a first sensor 130, a second sensor 132, a third sensor 134, a fourth sensor 136, a battery 138, and a solar panel 140. In one or more embodiments, the sensor device 104 includes a motor 142 that is capable of changing an orientation of the solar panel 140. In one or more embodiments, the sensor device 104 includes a display device (not shown).

In one or more embodiments, the memory 124 stores processor-executable instructions that, when executed by the CPU 122, cause the sensor device 104 to perform the functions of the sensor device 104 described herein. The CPU 122 uses the memory 120 as a working memory while executing the instructions. In one or more embodiments, the memory 120 is comprised of one or more random access memory (RAM) modules. In one or more embodiments, the memory 124 is comprised of one or more non-volatile random access memory (NVRAM) modules, such as electronically erasable programmable read-only memory (EEPROM) or Flash memory modules, for example.

In one or more embodiments, the I/O circuitry 126 includes buttons, switches, dials, knobs, a touchscreen, or other user-interface elements for inputting commands to the sensor device 104. The I/O circuitry 126 also may include a speaker, one or more light emitting devices, or other user-interface elements for outputting information or indications from the sensor device 104. The I/O circuitry 126 may include one or more data interfaces, for example, a 40-pin extended general-purpose input/output (GPIO) interface, a universal serial bus (USB) interface, a stereo output and composite video port, a high-definition multimedia interface (HDMI), camera serial interface (CSI), display serial interface (DSI), and a micro secure digital slot (MicroSD slot). In one or more embodiments, the I/O circuitry 126 includes circuitry that converts a voltage level of a signal output from the solar panel 140 to a voltage level that is suitable for charging the battery 138. In one or more embodiments, the I/O circuitry 126 includes circuitry that converts a voltage level of a control signal output from the microprocessor 118 to a voltage level that is suitable for controlling the motor 142.

In one or more embodiments, the transceiver 128 is configured to transmit and receive RF signals in accordance with one or more 3GPP communication standards, including 3G, 4G, 4G LTE, 5G, etc. In one or more embodiments, the transceiver 128 is configured to transmit and receive data signals in accordance with the IEEE 802.3 communication standards. In one or more embodiments, the transceiver 128 is configured to transmit and receive radio frequency (RF) signals in accordance with the Bluetooth (registered trademark) communication standards. In one or more embodiments, the transceiver 128 is configured to transmit and receive RF signals in accordance with the IEEE 802.11 AC communication standards. In one or more embodiments, the transceiver 116 includes a transmitter and a receiver that are provided in a single integrated circuit chip. The transceiver 128 may be configured to transmit and receive signals in accordance with other communications standards without departing from the scope of the present disclosure.

In one or more embodiments, the first sensor 130 is a temperature sensor that detects a temperature in an area in which the sensor device 104 is located, and outputs a signal or data that indicates the detected temperature.

In one or more embodiments, the second sensor 132 is a wind speed sensor that detects a wind speed in the area in which the sensor device 104 is located, and outputs a signal or data that indicates the detected wind speed.

In one or more embodiments, the third sensor 134 is a pressure sensor that detects a pressure (e.g., atmospheric pressure) in the area in which the sensor device 104 is located, and outputs a signal or data that indicates the detected pressure. In one or more embodiments, the third sensor 134 is a precipitation sensor that detects an amount of precipitation in the area in which the sensor device 104 is located, and outputs a signal or data that indicates the detected amount of precipitation. In one or more embodiments, the third sensor 134 is a humidity sensor that detects an amount of humidity in the area in which the sensor device 104 is located, and outputs a signal or data that indicates the detected amount of humidity.

In one or more embodiments, the fourth sensor 136 is a light sensor that detects a light intensity in one or more visible light bands (e.g., visible light band, infrared light band) in the area in which the sensor device 104 is located, and outputs a signal or data that indicates the detected light intensity. In one or more embodiments, the fourth sensor 136 is an image sensor that captures an image and outputs a signal or data corresponding to the captured image.

In one or more embodiments, the fourth sensor 136 is an air quality sensor that detects one or more concentrations of one or more chemicals/particles indicative of air quality in the area in which the sensor device 104 is located, and outputs a signal or data that indicates the detected one or more concentrations of the one or more chemicals/particles.

The first sensor 130, the second sensor 132, the third sensor 134, and the fourth sensor 136 may be different types of sensors than described above without departing from the scope of the present disclosure. Also, the sensor device 104 may include additional or fewer sensors than the first sensor 130, the second sensor 132, the third sensor 134, and the fourth sensor 136 without departing from the scope of the present disclosure In one or more embodiments, the battery 130 is a lithium-ion battery having an output voltage of 3.7 volts and a capacity of 700 milliamp hours. The battery 130 may be a different type of battery having a different terminal voltage and capacity without departing from the scope of the present disclosure.

In one or more embodiments, the solar panel 140 includes a plurality of photovoltaic solar cells that convert sunlight that illuminates the solar panel 140 into direct current electricity. In one or more embodiments, one or more of the sensor devices 104 includes a plurality of solar panels 140.

In one or more embodiments, the motor 142 is a stepper motor that is used to change the orientation of the solar panel 140. For example, the solar panel 140 may be mounted to a support structure to which the sensor device 104 is mounted. The rotor of the motor 142 may be coupled to a first gear that is coupled to a second gear that is mounted on the solar panel 140 such that rotation of the rotor causes the first gear to rotate the second gear, which causes the solar panel 140 to pivot in a given direction, as described below with reference to FIGS. 4A and 4B.

Figure 4A:
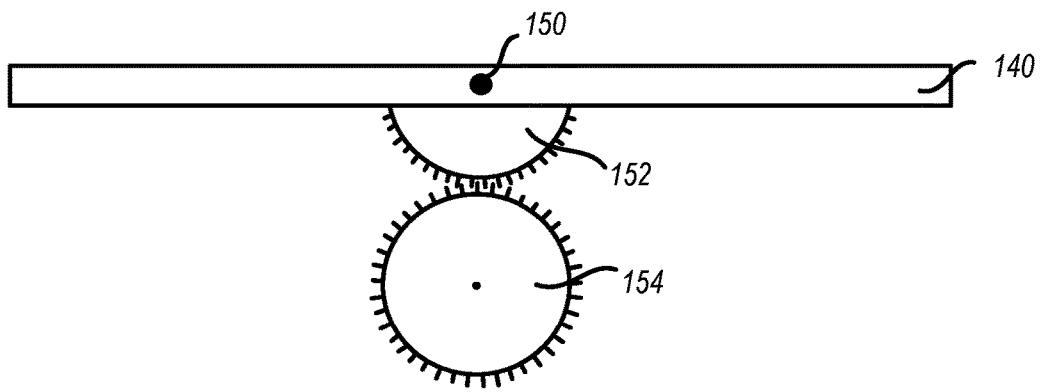
FIGS. 4A and 4B show an example a structure that is capable of changing the orientation of a solar panel according to one or more embodiments of the present disclosure.
Figure 4B:
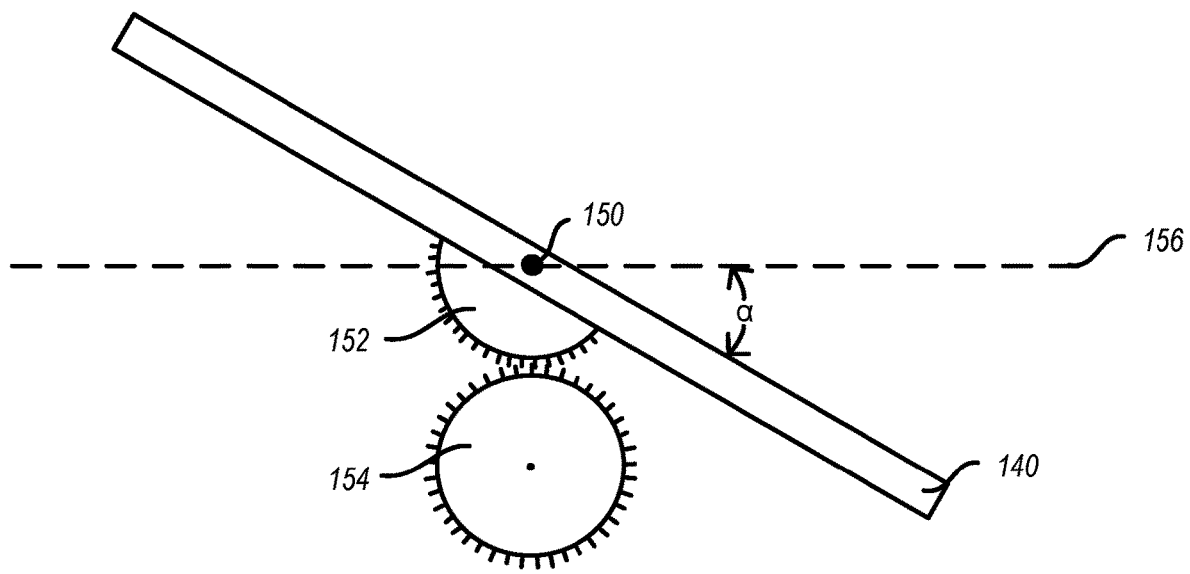

FIGS. 4A and 4B show an example of a structure that is capable of changing the orientation of a solar panel 140 of a sensor device 104 according to one or more embodiments of the present disclosure. More particularly, FIGS. 4A and 4B show a first end of the solar panel 140 having a mounting structure 150 that enables the solar panel 140 to be pivotally mounted to a support structure. Although not shown, a second end of the solar panel, which is opposite to the first end of the solar panel 140 shown in FIG. 4A, includes a similar mounting structure 150.

In one or more embodiments, the mounting structure 150 includes an annular aperture formed in the first and second ends of the solar panel 140. The solar panel 140 is mounted via rods that extend from a support structure, which are inserted into the apertures 150 such that the solar panel 140 is able to be pivoted about the rods.

In one or more embodiments, the mounting structure 150 includes an annular rod 150 that extends from the first and second ends of the solar panel 140. The solar panel 140 is mounted with the rods 150 inserted into apertures formed in a support structure such that the solar panel 140 is able to be pivoted about the rods 150 that extend from the ends of the solar panel 140.

A gear wheel 152 is mounted to a bottom surface of the solar panel 140, for example, using a pair of screws. Rotation of the gear wheel 152 causes the solar panel 140 to pivot via the mounting structure 150 at the first and second ends of the solar panel 140. A gear wheel 154 is mounted to the rotor of the motor 142 such that rotation of rotor causes the gear wheel 154 to rotate. The gear wheel 152 and gear wheel 154 are arranged such that respective teeth of the gear wheel 152 and the gear wheel 154 engage one another.

When the microprocessor 118 of the sensor device 104 controls the motor 142 to rotate in a particular direction by a specified amount in response to a command from the processing device 102, the gear wheel 154 rotates in the particular direction by the specified amount thereby causing the gear wheel 152 to rotate in the opposite direction by the specified amount, which changes the orientation of the solar panel 140. For example, the microprocessor 118 of the sensor device 104 may control the motor 142 to rotate in a counterclockwise direction by a specified amount, which causes the gear wheel 154 to rotate in the counterclockwise direction by the specified amount thereby causing the gear wheel 152 to rotate in the clockwise direction by the specified amount, which causes the solar panel 140 to form an angle $\alpha$ with respect to a predetermined (e.g., horizontal) direction or orientation that is indicated by the dashed line 156 in FIG. 4B.

The processing device 102 may obtain a particular value of the angle $\alpha$ for a solar panel 140 of a particular sensor device 104 that is optimized for a particular period of time (e.g., summer months), for example, based on sets of historical data related to solar intensity or weather and/or predicted weather in an area in which the sensor device 104 is located. The processing device 102 may transmit a message including data indicating the value of the angle $\alpha$ to the sensor device 104, which causes the microprocessor 118 of the sensor device 104 to control the motor 142 to rotate such that the solar panel 140 forms the desired angle $\alpha$ with respect to a reference orientation. In one or more embodiments, the processing device 102 obtains a particular value of the angle $\alpha$ that causes the solar panel 140 to have an orientation in which the solar panel 140 receives a maximum amount of sunlight. In one or more embodiments, the processing device 102 obtains a particular value of the angle $\alpha$ that causes the solar panel 140 to temporarily have an orientation (e.g., $\alpha=90$ degrees) and gravity causes dirt or melting snow or melting ice to fall off of the solar panel 140, so that the solar panel 140 is able to receive a greater amount of sunlight. The processing device 102 may then obtain another value of the angle $\alpha$ that causes the solar panel 140 to return to its previous orientation (e.g., $\alpha=0$ degrees).

In one or more embodiments, the processing device 102 is located at a centralized location and the sensor devices 104 are located at geographically dispersed locations. The processing device 102 determines a state of the battery 138 of each of the sensor devices 104 and estimates or predicts the amount of solar energy available in each area in which the sensor devices 104 are located during a particular period of time, and may then dynamically adjust operation of one or more of the sensor devices 104 if the state of the battery 138 of those sensor devices 104 and the estimated amount of solar energy available in one or more area indicates that those batteries 138 and solar panels 140 are not likely to provide sufficient energy to operate the sensor devices 104 during the particular period of time. The processing device 102 creates a power budget for each of the sensor devices 104, wherein each of the power budgets accounts for operations (e.g., processing operations, sensing operations, sensor measurement data storage operations, sensor measurement data transmission operations, solar panel movement operations, etc.) that drain nontrivial amounts of energy from the battery 138 of the sensor device 104 based on a state (e.g., percent charged, age, drain rate) of the battery 138.

Figure 5:
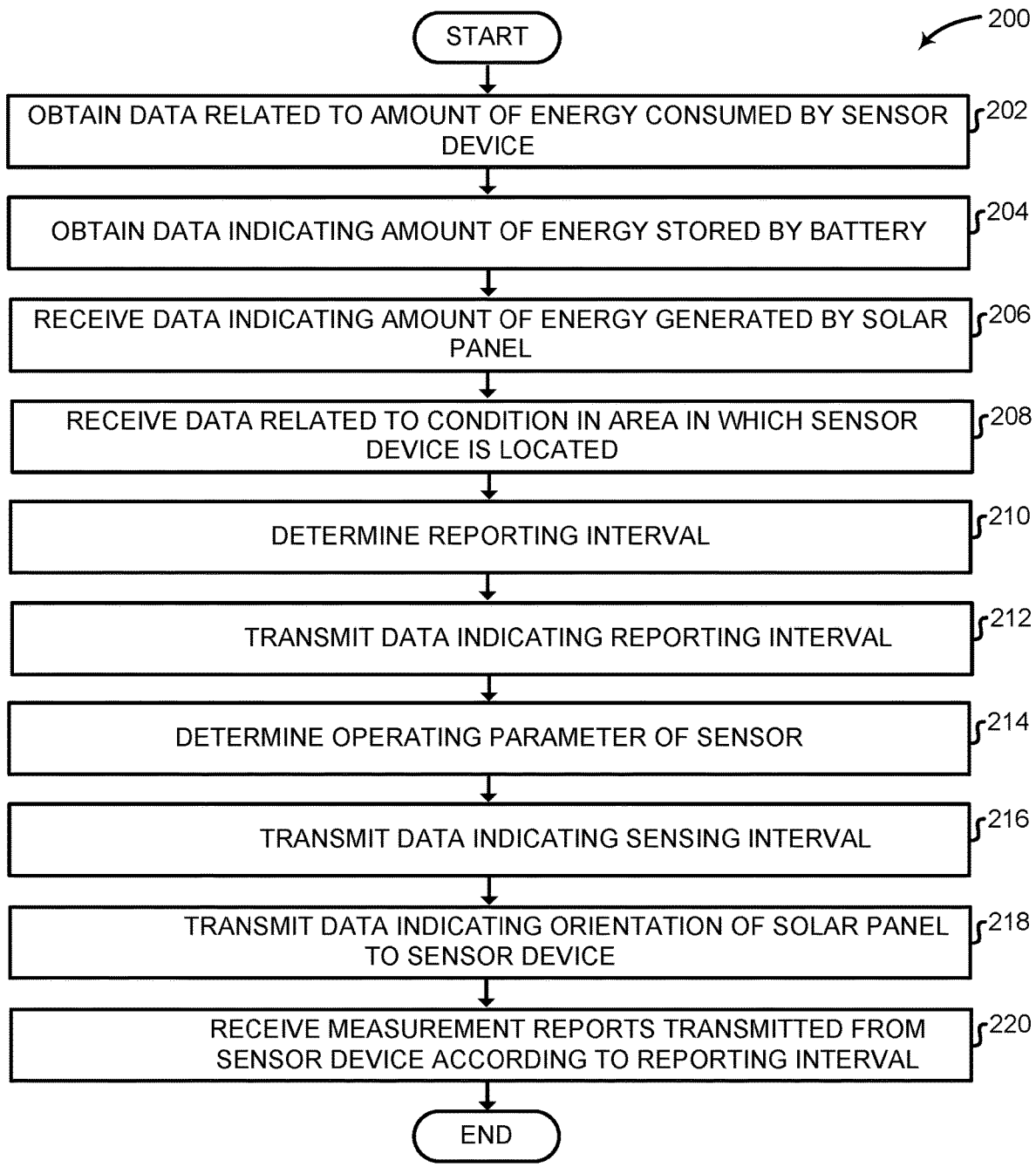
FIG. 5 is a flowchart of a method according to one or more embodiments of the present disclosure.

FIG. 5 is a flowchart of a method 200 according to one or more embodiments of the present disclosure. In one or more embodiments, the processing device 102 periodically performs the method 200 for each of the sensor devices 104. The method 200 begins at 202.

At 202, the processing device 102 obtains data related to an amount of energy consumed by a sensor device 104. In one or more embodiments, the processing device 102 stores a table or other suitable data structure that associates each a plurality of identifiers of operating modes of the sensor device 104 with one of a plurality of values indicating an amount of energy consumed by the sensor device 104 while operating in a respective one of the operating modes. For example, at 202, the processing device 102 stores a value indicating a current operating mode of the sensor device 104, and obtains the value indicating the amount of energy consumed by the sensor device 104 that is associated with the value indicating the current operating mode of the sensor device 104 from the above-described table. The method 200 then proceeds to 204.

At 204, the processing device 102 obtains data indicating an amount of energy stored by the battery 138 of the sensor device 104. In one or more embodiments, the processing device 102 receives from the sensor device 104 a message including the data indicating the amount of energy stored by the battery 138, which is measured by the I/O circuitry 126 of the sensor device 104. In one or more embodiments, the sensor device 104 transmits a message including the data indicating the amount of energy stored by the battery 138 in response to the I/O circuitry 126 of the sensor device 104 determining that the amount of energy stored by the battery 138 is below a predetermined threshold value. In one or more embodiments, the processing device 102 obtains the data indicating the amount of energy stored by the battery 138 of the sensor device 104 using a value indicating a particular amount of energy previously stored by the battery 138 that is stored in the memory 112 and subtracting a value corresponding to an estimated amount of energy consumed by the sensor device 104 after the particular amount of energy was stored by the battery 138. The method 200 then proceeds to 206.

At 206, the processing device 102 receives data indicating an amount of energy generated by the solar panel 140 of the sensor device 104. In one or more embodiments, the processing device 102 receives from the sensor device 104 a message including the data indicating the amount of energy generated by the solar panel 140, which is measured by the I/O circuitry 126 of the sensor device 104. In one or more embodiments, the sensor device 104 transmits a message including the data indicating the amount of energy generated by the solar panel 140 in response to the I/O circuitry 126 of the sensor device 104 determining that the amount of energy generated by the solar panel 140 is below a predetermined threshold value for at least a predetermined amount of time. The method 200 then proceeds to 208.

At 208, the processing device 102 receives data related to at least one condition in the area in which sensor device 104 is located. In one or more embodiments, the processing device 102 receives from the sensor device 104 a message that includes the data related to the at least one condition in the area in which sensor device 104 is located, which is measured by the sensor device 104. For example, the processing device 102 receives from the sensor device 104 a message that includes data indicating a temperature measured by the first sensor 130, data indicating a wind speed measured by the second sensor 132, data indicating a pressure measured by the third sensor 134, and data indicating a light intensity measured by the fourth sensor 136. In one or more embodiments, the processing device 102 receives from an external source (e.g., U.S. National Renewable Energy Laboratory (NREL)) data indicating historical weather information or historical sun intensity information. In one or more embodiments, the processing device 102 receives from an external source (e.g., U.S. National Weather Service) data indicating predicted weather information or predicted sun intensity information. The method 200 then proceeds to 210.

At 210, the processing device 102 determines a reporting interval that is to be used by the sensor device 104 to transmit messages that includes sensor measurement data. In one or more embodiments, the processing device 102 determines the reporting interval using the data indicating the amount of energy stored by the battery 138 that is obtained at 204 and the data related to the at least one condition in the area in which sensor device 104 is located that is received at 208. In one or more embodiments, the processing device 102 determines the reporting interval using the data related to the amount of energy consumed by the sensor device 104 that is obtained at 202, the data indicating the amount of energy stored by the battery 138 that is obtained at 204, and the data related to the at least one condition in the area in which sensor device 104 is located that is received at 208. In one or more embodiments, the processing device 102 determines the reporting interval using the processing device 102 determines the reporting interval using the data related to the amount of energy consumed by the sensor device 104 that is obtained at 202, the data indicating the amount of energy stored by the battery 138 that is obtained at 204, the data indicating the amount of energy generated by the solar panel 140 that is received at 206, the data related to the at least one condition in the area in which sensor device 104 is located that is received at 208. The method 200 then proceeds to 212.

At 212, the processing device 102 transmits data indicating the reporting interval that is determined at 210. In one or more embodiments, the processing device 102 transmits to the sensor device 104 a message that includes the data indicating the reporting interval. The method 200 then proceeds to 214.

At 214, the processing device 102 determines one or more operating parameters (e.g., sensing interval, mode of operation) that are used by one or more of the sensors 130-136. An interval of time between measurements by one of the sensors 130-136 of the sensor device 104 is referred to herein as a "sensing interval". In one or more embodiments, the processing device 102 determines the one or more sensing intervals using the data indicating the amount of energy stored by the battery 138 that is obtained at 204, the data related to the at least one condition in the area in which sensor device 104 is located that is received at 208, and the reporting interval determined at 210. In one or more embodiments, the processing device 102 determines the one or more sensing intervals using the data indicating the amount of energy stored by the battery 138 that is obtained at 204, the data indicating the amount of energy generated by the solar panel 140 that is received at 206, the data related to the at least one condition in the area in which sensor device 104 is located that is received at 208, and the reporting interval obtained at 210. In one or more embodiments, if the processing device 102 determines that one or more of the sensors 130-136 of the sensor device 104 are to be temporarily turned off in order to conserve energy, the processing device 102 uses a sensing interval that is a negative number for each of the one or more sensors 130-136 of the sensor device 104 that is to be temporarily turned off. The method 200 then proceeds to 216.

At 216, the processing device 102 transmits data indicating the one or more operating parameters that are determined at 214. In one or more embodiments, the processing device 102 transmits to the sensor device 104 a message that includes the data indicating the one or more sensing intervals. The method 200 then proceeds to 218.

At 218, the processing device 102 transmits data indicating one or more orientations of the solar panel 140 to the sensor device 104. In one or more embodiments, the processing device 102 transmits to the sensor device 104 a message that includes the data indicating the one or more orientations (e.g., angles) of the solar panel 140 with respect to a predetermined reference orientation. The method 200 then proceeds to 220.

At 220, the processing device 102 receives a plurality of measurement reports transmitted from the sensor device 104 according to the reporting interval obtained at 210. In one or more embodiments, the processing device 102 receives a plurality of messages transmitted from the sensor device 104, wherein each of the messages contains one of the measurement reports, and a time interval between consecutive messages is the reporting interval obtained at 210. In one or more embodiments, the method 200 then ends. In one or more embodiments, the method 200 then returns to 202 and the method 200 is repeated.

The above-described acts of the method 200 are not necessarily performed in the order shown in FIG. 5. For example, the acts described above in connection with 204, 206, and 208 may be performed at the same time by receiving a message that includes the data indicating the amount of energy stored by the battery 138, the data indicating the amount of energy generated by the solar panel 140, and the data related to the at least one condition in the area in which sensor device 104 is located. By way of another example, the acts described above in connection with 212 and 216 may be performed at the same time by transmitting a message that includes the sensing interval and the reporting interval. In addition, one or more of the above-described acts of the method 200 may be omitted. For example, the acts described above in connection with 206 and 218 may be omitted.

Having described the general structure and operation of the processing device 102 and the sensing devices 104, several examples of the processing performed by the processing device 102 at 210 and 214 to determine the reporting interval and the operating parameter of the sensor device 104 will be described below.

Each sensor device 104 consumes energy, wherein the amount of energy consumed by a given sensor device 104 depends on the amount of processing performed by its microprocessor 118, the particular sensor operations performed by its sensors 130-136, the amount of energy required by the memory 124 to temporarily store sensor measurement data before it is reported to the processing device 102, the frequency of transmitting messages from the sensor device 104 to the processing device 102 to report sensor measurement data, and the amount of time that its transceiver 128 spends transmitting those messages. The solar panel 140 of the sensor device 104 generates energy that may be used to perform such processing, sensor operations, and message transmissions. If the battery 138 is rechargeable, excess energy generated by the solar panel 140 may be stored by the battery 138. If the amount of energy generated by the solar panel 140 is not sufficient to provide power for a current level of processing, sensor operations, data storage, and message transmissions, the sensor device 104 consumes energy that is stored by its battery 138. The energy storage capacity of the battery 138 depends on the temperature of the battery 138, the discharge rate of the battery 138, and the age or point in the life cycle of the battery 138. The processing device 102 controls the sensor device 104 in order to dynamically adjust the energy consumed by the sensor device 104 depending on historical, current, and/or predicted conditions (e.g., weather) in an area in which the sensor device 104 is located.

In one or more embodiments, the processing device 102 predicts whether the solar intensity in the area in which each of the sensor devices 104 is located is likely to negatively or positively affect the ability of a solar panel 140 of a sensor device 104 to generate sufficient energy for operation of that sensor device 104. If the processing device 102 predicts that a solar panel 140 of a sensor device 104 is not likely to generate sufficient energy to keep the sensor device 104 operating in its current mode of operation for a predetermined amount of time, the processing device 102 generates one or more messages that are sent to the sensor device 104 in order to modify operations that are performed so that a reduced amount of energy is consumed by the sensor device 104. For example, the processing device 102 modifies operation of the sensor device 104 such that less frequent sensing is performed by one or more of the sensors 130-136, less sensor measurement data is temporarily stored, or such that a reduced number of the sensors 130-136 is powered on. If the processing device 102 predicts that a solar panel 140 of a sensor device 104 is likely to generate sufficient energy to operate the sensor device 104 in a different mode that requires additional energy, the processing device 102 generates one or more messages that are sent to the sensor device 104 in order to modify operations that are performed by the sensor device 104 so that increased energy is consumed. For example, the processing device 102 modifies operation of the sensor device 104 such that more frequent sensing is performed by one or more of the sensors 130-136, more sensor measurement data is temporarily stored, or such that an increased number of the sensors 130-136 is powered on.

The processing device 102 may control the sensor device 104 to dynamically adjust processing performed by its CPU 122, operation of one or more of its sensors 130-136 and/or frequency of transmissions performed by its transceiver 128. Also, if the battery 138 of the sensor device 104 is a rechargeable battery, the processing device 102 may control the sensor device 104 to maximize the amount of energy that is stored by the battery 138 in preparation for a period of predicted low solar intensity for the area. If the battery 138 of the sensor device 104 is not a rechargeable battery, the processing device 102 may control the sensor device 104 to enable the sensor device 104 to operate for as long as possible while still performing functionality that is deemed to be critical. For example, the processing device 102 may control a sensor device 104 to minimize drain on its battery 138 during periods of time in which the solar intensity on its solar panel 140 is expected to be relatively low.

In order for a sensor device 104 to keep running, the processing device 102 must configure the sensor device 104 such that the relationship set forth in Condition 1 below is met. Condition 1 requires that Energy Consumed is less than Total Useable Energy, wherein Energy Consumed is an amount of energy consumed by the sensor device 104 and Total Useable Energy is a total amount of energy that is usable by the sensor device 104. The processing device 102 may obtain a value of Total Useable Energy in Condition 1 using Equation 1 below. Equation 1 requires that Total Useable Energy is equal to the sum of Useable Energy Generated and Currently Stored Energy, wherein Useable Energy Generated is an amount of energy generated by the solar panel 140 and Currently Stored Energy is an amount of energy stored by the battery 138.

Equation 2 shows that the Energy Consumed is based on the sum of the Energy for Processing which is what the CPU and memory consume in order to operate the device, Energy for Communication which is what the transceiver consumes, Energy for Sensor Operation which is what is consumed when sensors take measurements, Quiescent Consumption which is the leakage power consumed due to the hardware design and any other power consumptions. This patent focuses on dynamically adjusting the consumption of communications and sensors in order to meet Condition 1.

The processing device 102 may obtain a value of the amount of energy generated by the solar panel 140 by recording the amount of energy generated given various light intensity and time of day scenarios and/or calculating the expected output based on predicted light intensity. The processing device 102 may obtain a value of Currently Stored Energy from the sensor device 104 from a direct measurement and/or from a calculation based on the current or expected temperature in the area in which the sensor device 104 is located, the discharge rate of the battery 138, and the age or life cycle of the battery 138, among other things. For example, the processing device 102 may store a table or other suitable data structure that includes a plurality of temperatures, each of which is associated a value that indicates a scaling factor such as a percentage of battery capacity relative to battery capacity at a baseline temperature (e.g., 70 degrees Fahrenheit). In addition, the processing device 102 may store a table or other suitable data structure that includes a plurality of ages, each of which is associated with a scaling factor such as a value that indicates a percentage of predicted current battery capacity relative to new battery capacity. The processing device 102 may receive from the sensor device 104 a message that includes data indicating a value of the capacity of the battery 138 and a value indicating a particular time at which a sensor circuit of the sensor device 104 measured the capacity of the battery 138, so that the processing device 102 can keep track of the capacity of the battery 138 over time.

In one or more embodiments, the processing device 102 keeps track of the discharge rate of the battery 138, and decreases the value of the capacity of the battery 138 (e.g., measured by the sensor device 104) based on one or more discharge rates of the battery 138 corresponding to one or more operating modes of the sensor device 104 and the amount of time that the sensor device 104 is operated in each of the operating modes. The processing device 102 then adjusts the resulting value to account for the temperature of the battery 138, for example, by multiplying the resulting value by a percentage of a battery capacity that is obtained based on the current temperature in the area in which the sensor device 104 is located, as set forth above. In addition, the processing device 102 multiplies the resulting value by a percentage of battery capacity that is based on the age of the battery 138, as set forth above. The resulting value may be used in Equation 2.

The processing device 102 may use a value of Energy Consumed in Equation 2 that is based, in part, on how often the sensor device 104 communicates with the processing device 102. An interval between consecutive transmissions used to communicate measurements made by one or more of the sensors 130-136 of the sensor device 104 is referred to herein as a "reporting interval". The processing device 102 may cause a reporting interval of a sensor device 104 to be adjusted in order to change the amount of energy that is consumed.

Condition 2 requires that the reporting interval is greater than the quantity Energy for a Communication multiplied by Time Interval divided by the quality Total Useable Energy for Time Interval minus All Other Energy Consumption for Time Interval, wherein Energy for a Communication is an amount of energy for a single communication transaction by the transceiver 128 in mWh (milliwatt hours), Time Interval is the relevant time period during which the sensor device 104 operates in hours, Total Useable Energy is a total amount of energy available to the sensor device 104 during the Time Interval in mWh, and the All Other Energy Consumption is an amount of energy consumed by the sensor device 104 to perform other tasks during the Time Interval in mWh.

Energy Consumed<Total Useable Energy     Condition 1:

Reporting Interval>(Energy for a Communication*Time Interval)/(Total Useable Energy for Time Interval−All Other Energy Consumption for Time Interval)     Condition 2:

Total Useable Energy=Useable Energy Generated+ Currently Stored Energy     Equation 1:

Energy Consumed=Energy for Processing+Energy for Communication+Energy for Sensor Operation+Quiescent Consumption+Etc.     Equation 2:

As an example, the processing device 102 can ultimately utilize the Conditions 1 and 2 and Equations 1 and 2 to implement logic and algorithms, where if the solar intensity is predicted to be low for the next 2 days due to stormy or cloudy weather in an area where a sensor device 104 is located then the minimum reporting interval can be calculated using 48 hours for the Time Interval. The Time Interval can be shortened if more resolution of the fluctuations of predicted solar intensity are known and operation adjustments made more frequent in order to maximize the performance of sensor device 104. If the current reporting interval being used by that sensor device 104 is lower than the calculated minimum, then the processing device 102 can automatically adjust the reporting interval for sensor device 104 so that it can continue to operate without shutting down. If the minimum reporting interval needed is not fast enough to provide the reporting frequency desired it could also look into adjusting the sensor operation as appropriate to get faster reporting. If a rechargeable battery is being used, the processing device could also try adjusting the reporting interval and/or sensor operation in the days leading up to low solar intensity days in order to try to maximize the energy in the battery in order to provide more useable energy during the low solar intensity period which would allow for faster reporting intervals and/or better sensor operation. This logic and algorithms can all be executed with code automatically following business rules of acceptable and desired operations and utilizing machine learning to improve predictions and actions taken.

In one or more embodiments, the I/O circuitry 126 includes circuitry that is capable of measuring the magnitude of different electrical currents flowing into various components, and outputting data indicating the measured magnitudes to the processing device 102. For example, the magnitude of current consumed while the transceiver 128 transmits a message including sensor measurement data is 150 milliamps, and the processing device 102 is programmed to calculate the amount of energy consumed while transmitting the message using the magnitude of the current consumed. In addition, the processing device 102 may keep track of the energy consumed while taking such measurements. For example, the magnitude of current consumed while taking a measurement is 1 milliamp, and the processing device 102 is programmed to calculate the amount of energy consumed while taking the measurement using the magnitude of the current consumed over a certain time interval.

Figure 6A:
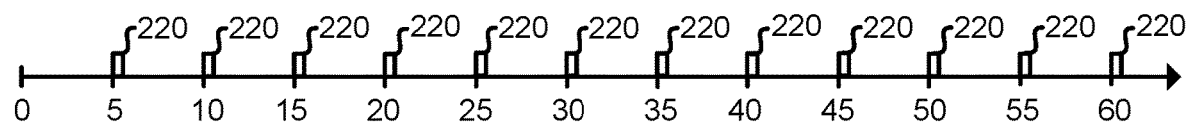
FIGS. 6A and 6B show timelines for explaining an example according to one or more embodiments of the present disclosure.
Figure 6B:
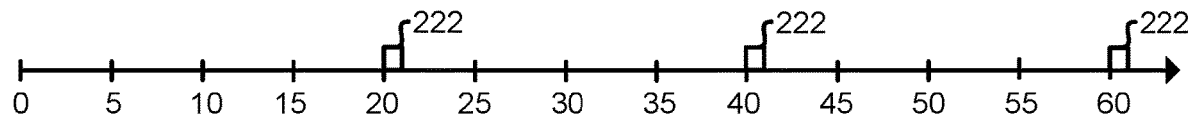

FIGS. 6A and 6B show timelines for explaining an example according to one or more embodiments of the present disclosure. FIG. 6A shows a plurality of sensor measurement report messages 220 transmitted from a sensor device 104 to the processing device 102. For example, each message 220 includes measurement data obtained from measurements made by the sensors 130-136 of the sensor device 104. As shown in FIG. 6A, the sensor device 104 transmits a sensor measurement report message 220 every five minutes. More particularly, every 5 minutes the transceiver 128 of the sensor device 104 transmits to the processing device 102 a message 220 that includes measurement data output from one or more of the sensors 130-136 of the sensor device 104.

In the present example, when the battery 138 of the sensor device 104 is fully charged, the battery 138 stores sufficient energy to operate the sensors 130-136 and transmit a sensor measurement report message 220 via the transceiver 128 every five minutes for approximately five days before it must be re-charged by the solar panel 140. If the processing device 102 estimates, using historical weather data and/or a predicted weather forecast, that there will not be sufficient solar intensity in the area in which the sensor device 104 is located for the next ten days, the processing device 102 alters the operation of the sensor device 104 so that it uses less energy and, thus, the sensor device 104 will not stop operating due to a lack of energy. For example, the processing device 102 generates a message that, when received and processed by the sensor device 104, causes the sensor device 104 to modify operations of the microprocessor 118, the transceiver 128, and the sensors 130-136 such that the sensors 130-136 take a measurement and output corresponding sensor measurement data every ten minutes, and the sensor measurement data is stored (e.g., in memory 124) until it is transmitted in a message 222 every twenty minutes, as shown in FIG. 6B. Thus, the messages 222 shown in FIG. 6B contain twice as much sensor measurement data as the messages 220 shown in FIG. 6A.

After the sensor device 104 transmits messages as shown in FIG. 6B for a period of time, if the processing device 102 estimates, using the historical weather data and/or the predicted weather forecast, that there will be sufficient solar intensity in the area in which the sensor device 104 is located for a sufficient period of time, the processing device 102 may alter the operation of the sensor device 104 so that it uses more energy, for example, by sending the sensor device 104 a message that causes the sensor device 104 to return to the sensor operations and sensor measurement report transmission shown in FIG. 6A.

In one or more embodiments, the processing device 102 take into account an estimated number of transmissions required by each of the sensor devices 104 in order for the processing device 102 to successfully receive a message that includes sensor measurement data. For example, the processing device 102 may store a table or other suitable data structure that associates a unique identifier of each of the sensor devices 104 with a type of zone. For example, if a unique identifier (e.g., serial number, network address) of a sensor device 104 is associated with a "good zone" type, the processing device 102 expects that the sensor device 104 will need to transmit each message including sensor measurement data only once in order for the processing device 102 to successfully receive the message. By way of another example, if the sensor device 104 is modifying its own operation and the sensor device 104 adjusts its own reporting interval, the sensor device 104 can store a value indicating how long it usually takes it to successfully make a report and use that value. Also, if a unique identifier of a sensor device 104 is associated with a "medium zone" type, the processing device 102 expects that the sensor device 104 will need to transmit each message including sensor measurement data twice (i.e., one retransmission of the message) in order for the processing device 102 to successfully receive the message. In addition, if a unique identifier of a sensor device 104 is associated with a "bad zone" type, the processing device 102 expects that the sensor device 104 will need to transmit each message including sensor measurement data three times (i.e., two retransmissions of the message) in order for the processing device 102 to successfully receive the message.

The type of zone with which a unique identifier of a sensor device 104 is associated may be determined based on a strength (e.g., average strength) of one or more signals received from the sensor device 104. For example, the unique identifier of the sensor device 104 may be associated with a "good zone" type if the strength of a signal received from the sensor device 104 is greater than or equal to a predetermined first threshold value. Also, the unique identifier of the sensor device 104 may be associated with a "medium zone" type if the strength of a signal received from the sensor device 104 less than the first threshold value and greater than a predetermined second threshold value. In addition, the unique identifier of the sensor device 104 may be associated with a "bad zone" type if the strength of a signal received from the sensor device 104 is less than or equal to the second threshold value.

In one or more embodiments, the processing device 102 determines whether the solar panel 140 of a sensor device 104 is damaged or dirty if information received from the sensor device 104 indicates that the solar panel 140 outputting less energy than expected. The processing device 102 can generate one or more messages that cause an unmanned drone to fly over an area in which the sensor device 104 is located and capture images of the sensor devices 104, and transmit to the processing device 102 data corresponding to the captured images. The processing device 102 analyzes the data corresponding to the captured images and determines whether something is blocking sunlight from irradiating the solar panel 140 or whether the solar panel 140 is damaged. If the processing device 102 determines that the solar panel 140 is dirty, the processing device 102 may generate a message that causes a drone to fly to the sensor device 104 and clean the solar panel 140.

FIGS. 7A and 7B are examples of tables according to one or more embodiments of the present disclosure. The table shown in FIG. 7A associates each of a plurality of identifiers of a plurality of operating modes of a sensor device 104 with a particular sensing interval and a particular reporting interval for each of the sensors 130-136. If one of the sensors 130-136 is to be powered off during one of the operating modes, the sensing interval and reporting interval are indicated as "−1" for that sensor. In operating mode 0, each of the sensors 130-136 is powered off. For example, the processing device 102 may configure the sensor device 104 to operate in operating mode 0 when the amount of energy stored by its battery 138 is very low and the amount of energy that is expected to be generated by its solar panel 140 is expected to be very low for an upcoming period of time (e.g., week). In operating modes 1 to 4, additional ones of the sensors 130-136 are powered on. In operating modes, 5 to 12, the sensing interval and reporting interval for the sensors 130-136 are increased. Accordingly, the higher the operating mode, the greater the amount of energy required by the sensor device 104 to operate.

The table shown in FIG. 7B associates each of the identifiers of the operating modes shown in FIG. 7A with a condition related to a battery capacity of the battery 138 of the sensor device 104 and a condition related to a solar energy level that is expected to be available to illuminate the solar panel 140 during an interval of time. For example, if a current battery capacity level (BCL) of the battery 138 is less than a predetermined battery capacity level BCL0, and if a solar energy level (SEL) in an area in which the sensor device 104 is located is expected to be less than a predetermined solar energy level SEL0 during a time interval for which the sensor device 104 is to be configured, the processing device 102 configures the sensor device 104 to operate at operating level 0 to minimize the amount of energy consumed by the sensor device 104. The processing device 102 keeps track of the battery capacity level of the battery 138 and the solar energy level that is expected over time. As the battery capacity level of the battery 138 increases and the solar energy level available to the solar panel 140 increases, the processing device 102 configures the sensor device 104 to operate at increased operating modes, as shown in FIG. 7B.

The tables shown in FIGS. 7A and 7B are merely examples. Different values may be used without departing from the scope of the present disclosure. For example, different values may be used in the table shown in FIG. 7A depending on a minimum acceptable level of functionality that is acceptable for a given implementation. For example, if at a minimum, the sensor 130 must remain powered on at all times, the operating mode 0 would not be used. Also, the particular values of the parameters included in the table shown in FIG. 7B may be obtained via actual experimentation or simulation results, for example.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   obtaining data indicating an amount of energy stored by a battery of a sensor device;
   receiving data related to at least one condition in an area in which the sensor device is located,
   wherein the data related to at least one condition in the area in which the sensor device is located indicates at least a temperature value for the area in which the sensor device is located;
   obtaining a first scaling factor based on the temperature value for the area in which the sensor device is located;
   determining a first reporting interval based on the data indicating the amount of energy stored by the battery of the sensor device, data related to an estimated number of retransmissions of a measurement report transmitted from the sensor device, and the first scaling factor obtained based on the temperature value for the area in which the sensor device is located;
   transmitting data indicating the first reporting interval to the sensor device; and
   receiving a plurality of measurement reports transmitted from the sensor device according to the first reporting interval.

2. The method according to claim 1, comprising:
   determining a second reporting interval, the second reporting interval being greater than the first reporting interval;
   transmitting data indicating the second reporting interval to the sensor device; and
   receiving a plurality of measurement reports transmitted from the sensor device according to the second reporting interval.

3. The method according to claim 1, comprising:
   receiving data indicating an amount of energy generated by a solar panel of the sensor device,
   wherein the first reporting interval is determined based in part on the data indicating the amount of energy generated by the solar panel of the sensor device.

4. The method according to claim 1, further comprising:
   obtaining a second scaling factor based on an age of the battery of the sensor device,
   wherein the determining the first reporting interval includes determining the first reporting interval based on the data indicating the amount of energy stored by the battery of the sensor device, the first scaling factor obtained based on the temperature value for the area in which the sensor device is located, and the second scaling factor obtained based on the age of the battery of the sensor device.

5. The method according to claim 1, further comprising:
   obtaining data related to an amount of energy consumed by the sensor device,
   wherein the determining the first reporting interval includes determining the first reporting interval based on the data indicating the amount of energy stored by the battery of the sensor device, the data related to at least one condition in the area in which the sensor device is located, and the data related to the amount of energy consumed by the sensor device.

6. The method according to claim 1, comprising:
   determining an operating parameter of a sensor of the sensor device based on the data indicating the amount of energy stored by the battery of the sensor device, the data related to at least one condition in the area in which the sensor device is located, and the data indicating the first reporting interval; and transmitting data indicating the operating parameter of the sensor of the sensor device.

7. The method according to claim 1, comprising:

generating data indicating that a sensor of the sensor device is to perform a sensing operation less frequently than the sensor is currently performing the sensing operation based on the data indicating the amount of energy stored by the battery of the sensor device, the data related to at least one condition in an area in which the sensor device is located, and the data indicating the first reporting interval; and transmitting the data indicating that at least one sensor of the sensor device is to be perform the sensing operation less frequently than the sensor is currently performing the sensing operation to the sensor device.

8. The method according to claim 1, comprising:

receiving data related to weather that is predicted for the area in which the sensor device is located, wherein the first reporting interval is determined based in part on the data related to weather that is predicted for the area in which the sensor device is located.

9. The method according to claim 1, wherein the first reporting interval is based in part on data related to a strength of a signal received from the sensor device.

10. A device comprising:

at least one processor; and at least one memory storing instructions that, when executed by the at least one processor, cause the device to:

obtain data indicating an amount of energy stored by a battery of a sensor device;

receive data related to at least one condition in an area in which the sensor device is located, wherein the data related to at least one condition in the area in which the sensor device is located indicates at least a temperature value for the area in which the sensor device is located;

obtain a first scaling factor based on the temperature value for the area in which the sensor device is located;

determine a first reporting interval based on the data indicating the amount of energy stored by the battery of the sensor device, data related to an estimated number of retransmissions of a measurement report transmitted from the sensor device, and the first scaling factor obtained based on the temperature value for the area in which the sensor device is located;

transmit data indicating the first reporting interval to the sensor device; and receive a plurality of measurement reports transmitted according to the first reporting interval from the sensor device.

11. The device according to claim 10, wherein the instructions, when executed by the at least one processor, cause the device to:

determine a second reporting interval, the second reporting interval being greater than the first reporting interval;

transmit data indicating the second reporting interval to the sensor device; and receive a plurality of measurement reports transmitted from the sensor device according to the second reporting interval.

12. The device according to claim 10, wherein the instructions, when executed by the at least one processor, cause the device to:

receive data indicating an amount of energy generated by a solar panel of the sensor device, wherein the first reporting interval is determined based in part on the data indicating the amount of energy generated by the solar panel of the sensor device.

13. The device according to claim 10, wherein the at least one memory stores data related to an amount of energy consumed by the sensor device, and wherein the instructions, when executed by the at least one processor, cause the device to determine the first reporting interval based on the data indicating the amount of energy stored by the battery of the sensor device, the data related to at least one condition in the area in which the sensor device is located, and the data related to the amount of energy consumed by the sensor device.

14. The device according to claim 10, wherein the instructions, when executed by the at least one processor, cause the device to:

determine an operating parameter of a sensor of the sensor device based on the data indicating the amount of energy stored by the battery of the sensor device, the data related to at least one condition in the area in which the sensor device is located, and the data indicating the first reporting interval; and transmit data indicating the operating parameter of the sensor of the sensor device.

15. The device according to claim 10, wherein the instructions, when executed by the at least one processor, cause the device to:

generate data indicating that at least one sensor of the sensor device is to be turned off based on the data indicating the amount of energy stored by the battery of the sensor device, the data related to at least one condition in the area in which the sensor device is located, and the data indicating the first reporting interval; and transmit to the sensor device the data indicating that at least one sensor of the sensor device is to be turned off.

16. The device according to claim 10, wherein the instructions, when executed by the at least one processor, cause the device to:

receive data related to weather that is predicted for the area in which the sensor device is located, wherein the first reporting interval is based in part on the data related to weather that is predicted for the area in which the sensor device is located.

17. The device according to claim 10, wherein the instructions, when executed by the at least one processor, cause the device to:

generate a message that, when processed by the sensor device, causes the sensor device to change an orientation of the solar panel; and transmit the message to the sensor device.

18. A non-transitory computer-readable medium storing instructions that, when executed by a computer, cause the computer to:

obtain data indicating an amount of energy stored by a battery of a sensor device;

receive data related to at least one condition in an area in which the sensor device is located wherein the data related to at least one condition in the area in which the sensor device is located indicates at least a temperature value for the area in which the sensor device is located;

obtain a first scaling factor based on the temperature value for the area in which the sensor device is located;

determine a first reporting interval based on the data indicating the amount of energy stored by the battery of the sensor device, data related to an estimated number of retransmissions of a measurement report transmitted from the sensor device, and the first scaling factor obtained based on the temperature value for the area in which the sensor device is located;

transmit data indicating the first reporting interval to the sensor device; and receive a plurality of measurement reports transmitted from the sensor device according to the first reporting interval.

19. The computer-readable medium according to claim 18, wherein the instructions, when executed by the computer, cause the computer to:

determine a second reporting interval, the second reporting interval being greater than the first reporting interval;

transmit data indicating the second reporting interval to the sensor device; and receive a plurality of measurement reports transmitted from the sensor device according to the second reporting interval.

* * * * *